US012075257B2

(12) United States Patent
Abeysekera et al.

(10) Patent No.: US 12,075,257 B2
(45) Date of Patent: Aug. 27, 2024

(54) WIRELESS COMMUNICATION SYSTEM, INTERMEDIATE PROCESSING DEVICE, COMMUNICATION CONTROL METHOD, AND COMMUNICATION CONTROL PROGRAM

(71) Applicant: NIPPON TELEGRAPH AND TELEPHONE CORPORATION, Tokyo (JP)

(72) Inventors: Hirantha Abeysekera, Musashino (JP); Toshiro Nakahira, Musashino (JP);

(Continued)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 78 days.

(21) Appl. No.: 17/791,199

(22) PCT Filed: Jan. 28, 2020

(86) PCT No.: PCT/JP2020/002981
§ 371 (c)(1),
(2) Date: Jul. 6, 2022

(87) PCT Pub. No.: WO2021/152695
PCT Pub. Date: Aug. 5, 2021

(65) Prior Publication Data
US 2023/0034313 A1 Feb. 2, 2023

(51) Int. Cl.
*H04W 28/08* (2023.01)
*H04W 16/04* (2009.01)
*H04W 28/02* (2009.01)

(52) U.S. Cl.
CPC ....... *H04W 16/04* (2013.01); *H04W 28/0289* (2013.01); *H04W 28/08* (2013.01)

(58) Field of Classification Search
CPC ............ H04W 16/04; H04W 28/0289; H04W 28/08
See application file for complete search history.

(56) References Cited

U.S. PATENT DOCUMENTS

| 2014/0086212 | A1* | 3/2014 | Kafle | H04B 17/345 |
| | | | | 370/329 |
| 2015/0289142 | A1* | 10/2015 | Abeysekera | H04W 72/0453 |
| | | | | 370/338 |
| 2017/0127343 | A1* | 5/2017 | Im | H04W 8/20 |

FOREIGN PATENT DOCUMENTS

| JP | 2012253582 A | 12/2012 |
| JP | 201737569 A | 2/2017 |
| WO | WO-2014073706 A1 | 5/2014 |

OTHER PUBLICATIONS 802.11 High Speed Wireless LAN Text, "802.11 High Speed Wireless LAN Text" 3rd edition, Mar. 2008.

* cited by examiner

*Primary Examiner* — Shukri Taha
(74) *Attorney, Agent, or Firm* — Harness, Dickey & Pierce, P.L.C.

(57) ABSTRACT

In a wireless communication system including an intermediate processing device which performs processing between a plurality of base stations to which terminal stations are connectable and a base station control device which controls each of the base stations, the intermediate processing device includes an information collection unit configured to collect wireless environment information which includes information regarding the terminal stations connected to the base stations and which indicates wireless environments around (Continued)

the base stations and the terminal stations, from each of the base stations, a first conversion unit configured to convert the wireless environment information collected by the information collection unit into first information which is equally processable by the base station control device without distinction for each of the base stations, a transmission unit configured to transmit the first information to the base station control device, a reception unit configured to receive a parameter calculated by the base station control device based on the first information, and a second conversion unit configured to convert the parameter received by the reception unit into individual second information in accordance with each of the base stations, and each of the base stations includes a reception unit configured to receive the second information and a setting unit configured to perform setting so as to perform communication with each of the terminal stations based on the second information.

17 Claims, 7 Drawing Sheets

(72) Inventors: Shoko Shinohara, Musashino (JP);
Koichi Ishihara, Musashino (JP);
Yasushi Takatori, Musashino (JP)

WIRELESS COMMUNICATION SYSTEM, INTERMEDIATE PROCESSING DEVICE, COMMUNICATION CONTROL METHOD, AND COMMUNICATION CONTROL PROGRAM

CROSS-REFERENCE TO RELATED APPLICATIONS

This application is a 371 U.S. National Phase of International Application No. PCT/JP2020/002981, filed on Jan. 28, 2020. The entire disclosure of the above application is incorporated herein by reference.

TECHNICAL FIELD

The present invention relates to a wireless communication system, an intermediate processing device, a communication control method, and a communication control program.

BACKGROUND ART

In recent years, a wide spread of high-performance portable wireless terminals such as notebook computers and smartphones has led a wireless local area network (LAN) which complies with IEEE802.11 standards to be widely used also at home, let alone at companies and in publicly accessible spaces.

The wireless LAN which complies with IEEE802.11 standards includes a wireless LAN complying with IEEE802.11b/g/n standards in which a 2.4 GHz band is used and a wireless LAN complying with IEEE802.11a/n/ac standards in which a 5 GHz band is used.

In the wireless LAN complying with IEEE802.11b standards and IEEE802.11g standards, 13 channels are prepared at intervals of 5 MHz from 2400 MHz to 2483.5 MHz. However, in a case where a plurality of channels are used at the same location, it is possible to use up to three channels or four channels at the same time by using channels so that spectra do not overlap with each other to avoid interference.

In the wireless LAN complying with IEEE802.11a standards, a total of 19 channels including 8 channels and 11 channels which do not overlap with each other are respectively defined between 5170 MHz and 5330 MHz and between 5490 MHz and 5710 MHz in Japan. Note that in IEEE802.11a standards, a band width per channel is fixed at 20 MHz.

Maximum transmission speed of the wireless LAN is 11 Mbps in IEEE802.11b standards and is 54 Mbps in IEEE802.11a standards and IEEE802.11g standards. However, the transmission speed here is transmission speed on a physical layer.

Actually, transmission efficiency in a medium access control (MAC) layer is approximately from 50 to 70%, and thus, an upper limit value of throughput is approximately 5 Mbps in IEEE802.11b standards and is approximately 30 Mbps in IEEE802.11a standards and IEEE802.11g standards. Further, transmission speed further decreases if the number of wireless stations which try to transmit information increases.

Meanwhile, in a wired LAN, as well as a 100 Base-T interface of Ethernet (registered trademark), fiber to the home (FTTH) which uses an optical fiber has been spread also at every home, and high-speed lines on the order of 100 Mbps to 1 Gbps are provided. Thus, further higher transmission speed is desired also in the wireless LAN.

In IEEE802.11n standards for which standardization has been completed in 2009, a channel band width which has been fixed at 20 MHz so far is expanded to up to 40 MHz, and introduction of multiple input multiple output (MIMO) technique is determined. If transmission and reception are performed by applying all functions defined in IEEE802.11n standards, communication speed of up to 600 Mbps can be achieved in a physical layer.

Further, in IEEE802.11ac standards for which standardization has been completed in 2013, it is determined to expand a channel band width to 80 MHz or up to 160 MHz (or 80+80 MHz) and introduce a transmission method of multiuser MIMO (MU-MIMO) in which space division multiple access (SDMA) is applied. If transmission and reception are performed by applying all functions defined in IEEE802.11ac standards, communication speed of up to approximately 6.9 Gbps can be achieved in a physical layer.

Further, in IEEE802.11ax standards which are currently under formulation, orthogonal frequency division multiple access (OFDMA) which enables transmission and reception of frames by dividing channels of 20 MHz, 40 MHz, 80 MHz, 160 MHz and 80+80 MHz described above into finer sub-channels, is expected to be defined. Use of OFDMA enables simultaneous transmission by a plurality of wireless stations in unit of a resource unit by dividing the above-described channels into finer sub-channels. Further, a function of increasing communication opportunities while reducing interference from other peripheral cells by control of a carrier sense threshold (CCA threshold) is expected to be defined in IEEE802.11ax standards.

The wireless LAN complying with IEEE802.11 standards is operated in a frequency band of a 2.4 GHz band or a 5 GHz band for which license is not required. In this event, in a case where a base station complying with IEEE802.11 standards forms a wireless LAN cell (basic service set (BSS)), the base station selects one frequency channel from frequency channels which can be supported at the own station and operates the frequency channel.

A channel to be used at the own cell, setting values of a band width and other parameters, and other parameters which can be supported at the own station are described in a Beacon frame which is periodically transmitted, a Probe response frame for a Probe Request frame received from a wireless terminal, or the like. Further, the base station operates the cell by transmitting a frame on the frequency channel which the base station determines to operate and notifying subordinate wireless terminals and other peripheral wireless stations.

Examples of a method for selecting and setting a frequency channel, a band width and other parameters at the base station can include the following four methods:
(1) a method in which default parameter values set in advance at the base station are used as is,
(2) a method in which values manually set by a user who operates the base station are used,
(3) a method in which parameter values are autonomously selected and set based on wireless environment information detected by each base station upon start-up, and
(4) a method in which parameter values determined by a central control station such as a wireless LAN controller are set.

Further, the number of channels which can be used at the same time at the same location is 3 in a wireless LAN of a 2.4 GHz band, and 2, 4, 9 or 19 in a wireless LAN of a 5 GHz band in accordance with a channel band width to be used for communication. Thus, in a case where a wireless LAN is actually introduced, it is necessary to select a channel to be used by the base station within the own BSS (see, for example, Non-Patent Literature 1).

While the number of channels which can be used at the same time at the same location in a 5 GHz band is 19 channels in a case where the channel band width is 20 MHz, in a case where the channel band width is expanded to 40 MHz, 80 MHz, 160 MHz or 80+80 MHz, the number of channels which can be used at the same time at the same location in a 5 GHz band decreases to 9 channels, 4 channels, and 2 channels. In other words, the number of channels which can be used decreases as the channel band width increases.

In a wireless LAN dense environment where the number of channels which can be used is larger than the number of BSSs, a plurality of BSSs use the same channel (overlapping BSS (OBSS)). Thus, in the wireless LAN, autonomous distributed access control in which data is transmitted only in a case where a channel is available by carrier sense is used using carrier sense multiple access with collision avoidance (CSMA/CA).

Specifically, a wireless station at which a transmission request occurs first performs carrier sense in a predetermined sensing period (distributed inter-frame space (DIFS)) to monitor a state of a wireless medium, and if there is no transmission signal by other wireless stations in this period, performs random back-off. The wireless station continuously performs carrier sense also during a random back-off period, and in a case where there is no transmission signal by other wireless stations also in this period, obtains right to utilize a channel.

Note that whether there is transmission/reception by other wireless stations is determined by whether or not a signal greater than a carrier sense threshold set in advance is received. The wireless station which obtains the right to utilize the channel can transmit data to other wireless stations within the same BSS and can receive data from these other wireless stations.

In a case where such CSMA/CA control is performed, in a wireless LAN dense environment where the same channel is used, a channel becomes busy more frequently by carrier sense, which lowers throughput. It is therefore important to monitor a surrounding environment, select an appropriate channel and select a transmission power value and a carrier sense threshold which enable simultaneous transmission and reception.

Further, a method for selecting the above-described parameters such as a type of 2.4 GHz or 5 GHz which is an operating frequency band of the base station and a channel to be utilized in the operating frequency band is not defined in IEEE802.11 standards, and thus, respective vendors which supply base stations employ individual methods.

Further, the respective wireless stations select the above-described parameters in an autonomous distributed manner, which makes it impossible to achieve optimization as the whole system, and, particularly, in an environment where there are a number of wireless stations, there is a case where user quality largely degrades.

Still further, in recent years, the number of wireless stations at which a plurality of wireless modules are mounted has increased. This is because a band width to be used can be expanded and user throughput within a service area can be increased by mounting a plurality of wireless modules in the same chassis and using different frequency bands and different channels.

CITATION LIST

Non-Patent Literature

Non-Patent Literature 1: supervised by Masahiro Morikura, Shuji Kubota, "802.11 high-speed wireless LAN textbook", revised third edition, Impress R&D, March, 2008

SUMMARY OF THE INVENTION

Technical Problem

However, if a frequency band to be used and a channel to be used by each wireless module to be mounted are not appropriately set, there is a problem that the wireless modules interfere with each other as well as the wireless station interferes with other peripheral wireless stations, which makes it impossible to provide assumed service.

Further, in a case where a plurality of base stations with different capabilities in terms of characteristics and different functions are accommodated in a wireless communication system, such as in a case where manufacturers which manufacture base stations are different, a difference occurs in information which can be collected by a base station control device which controls the base stations in a concentrated manner from each of the plurality of base stations. Further, the base station control device cannot control the respective base stations in a concentrated manner if different parameters, or the like, are not individually set in accordance with different capabilities in terms of characteristics and different functions of the respective base stations.

In other words, it has been necessary in related art to individually provide control servers (control engines or controllers), or the like, for each of the base stations with different capabilities in terms of characteristics and different functions.

An object of the present invention is to provide a wireless communication system, an intermediate processing device, a communication control method, and a communication control program, with which collective control is enabled even if a plurality of base stations have different capabilities in terms of characteristics or different functions.

Means for Solving the Problem

A wireless communication system according to one aspect of the present invention is a wireless communication system including an intermediate processing device which performs processing between a plurality of base stations to which terminal stations are connectable and a base station control device which controls each of the base stations, the intermediate processing device including an information collection unit configured to collect wireless environment information which includes information regarding the terminal stations connected to the base stations and which indicates wireless environments around the base stations and the terminal stations, from each of the base stations, a first conversion unit configured to convert the wireless environment information collected by the information collection unit into first information which is equally processable by the base station control device without distinction for each of the base stations, a transmission unit configured to transmit the first information to the base station control device, a reception unit configured to receive a parameter calculated by the base station control device based on the first information, and a second conversion unit configured to convert the parameter received by the reception unit into individual second information in accordance with each of the base stations, and each of the base stations including a reception unit configured to receive the second information, and a setting unit configured to perform setting so as to perform communication with each of the terminal stations based on the second information.

Further, an intermediate processing device according to one aspect of the present invention is an intermediate processing device which performs processing between a plurality of base stations to which terminal stations are connectable and a base station control device which controls each of the base stations, the intermediate processing device including an information collection unit configured to collect wireless environment information which includes information regarding the terminal stations connected to the base stations and which indicates wireless environments around the base stations and the terminal stations, from each of the base stations, a first conversion unit configured to convert the wireless environment information collected by the information collection unit into first information which is equally processable by the base station control device without distinction for each of the base stations, a first transmission unit configured to transmit the first information to the base station control device, a reception unit configured to receive a parameter calculated by the base station control device based on the first information, a second conversion unit configured to convert the parameter received by the reception unit into individual second information in accordance with each of the base stations, and a second transmission unit configured to transmit the individual second information to each of the base stations.

Further, a communication control method according to one aspect of the present invention is a communication control method for controlling a wireless communication system including a base station control device which controls each of a plurality of base stations to which terminal stations are connectable, the communication control method including an information collection step of collecting wireless environment information which includes information regarding the terminal stations connected to the base stations and which indicates wireless environments around the base stations and the terminal stations, from each of the base stations, a first conversion step of converting the collected wireless environment information into first information which is equally processable by the base station control device without distinction for each of the base stations, a first transmission step of transmitting the first information to the base station control device, a reception step of receiving a parameter calculated by the base station control device based on the first information, a second conversion step of converting the received parameter into individual second information in accordance with each of the base stations, and a second transmission step of transmitting the individual second information to each of the base stations.

Effects of the Invention

According to the present invention, it is possible to enable collective control even if a plurality of base stations respectively have different capabilities in terms of characteristics or different functions.

DESCRIPTION OF EMBODIMENTS

Figure 1:
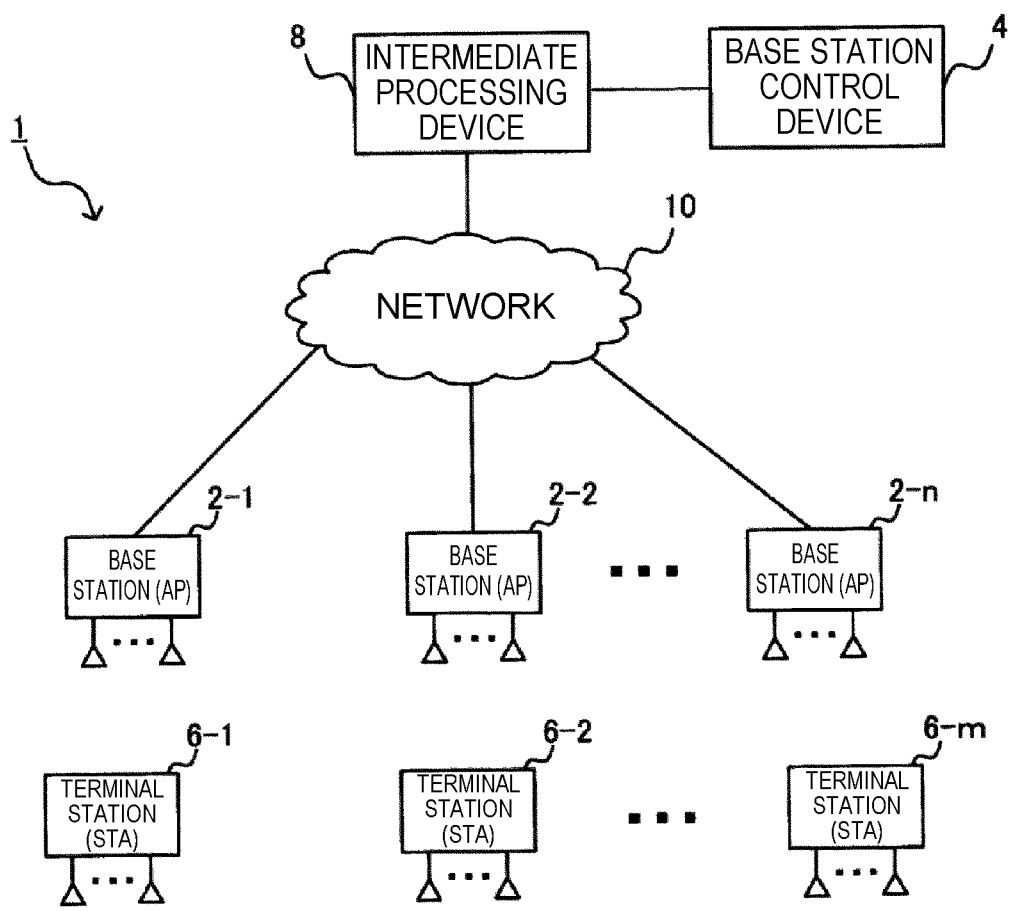
FIG. 1 illustrates a configuration example of a wireless communication system according to one embodiment.

One embodiment of a wireless communication system will be described below using the drawings. FIG. 1 illustrates a configuration example of a wireless communication system 1 according to one embodiment. As illustrated in FIG. 1, the wireless communication system 1 includes, for example, n base stations (APs) 2-1 to 2-n, a base station control device 4, and an intermediate processing device 8, and, for example, m terminal stations 6-1 to 6-m are located around the base stations 2-1 to 2-n.

The base stations 2-1 to 2-n are connected to the intermediate processing device 8 via a network 10. Further, the base stations 2-1 to 2-n are connected to the base station control device 4 via the intermediate processing device 8. Further, the terminal stations 6-1 to 6-m are connectable to at least one of the base stations 2-1 to 2-n. Still further, the intermediate processing device 8 performs processing which will be described later between the base stations 2-1 to 2-n and the base station control device 4 which controls the base stations 2-1 to 2-n.

Note that the base stations 2-1 to 2-n include a plurality of base stations having different capabilities in terms of characteristics and different functions. For example, manufacturers, models, or the like, of the base station 2-1 and the base station 2-2 are different, and there is a difference in capabilities in terms of characteristics and functions between the base station 2-1 and the base station 2-2.

Here, the difference in capabilities in terms of characteristics refers to, for example, a difference in characteristics such as sensitivity (including a collection method and a calculation method) in received signal strength indicators (RSSIs) of the base station 2-1 and the base station 2-2 even if the base station 2-1 and the base station 2-2 have reception functions supporting the same communication standards.

Further, the difference in functions refers to, for example, a difference in functions of the base station 2-1 and the base station 2-2 such as a difference between the number of antennas through which the base station 2-1 can perform reception and the number of antennas through which the base station 2-2 can perform reception even if the base station 2-1 and the base station 2-2 have reception functions supporting the same communication standards. Still further, the base station 2-1 and the base station 2-2 have different interfaces with other devices, control commands from outside, or the like.

Note that while an example of a case will be described where the wireless communication system 1 operates while complying with, for example, IEEE802.11ax standards, the system is not limited to this, and the system may operate while complying with other communication standards. Hereinafter, a component which is not specified among a plurality of components as the base stations 2-1 to 2-*n* will be simply abbreviated as a base station 2, or the like.

Figure 2:
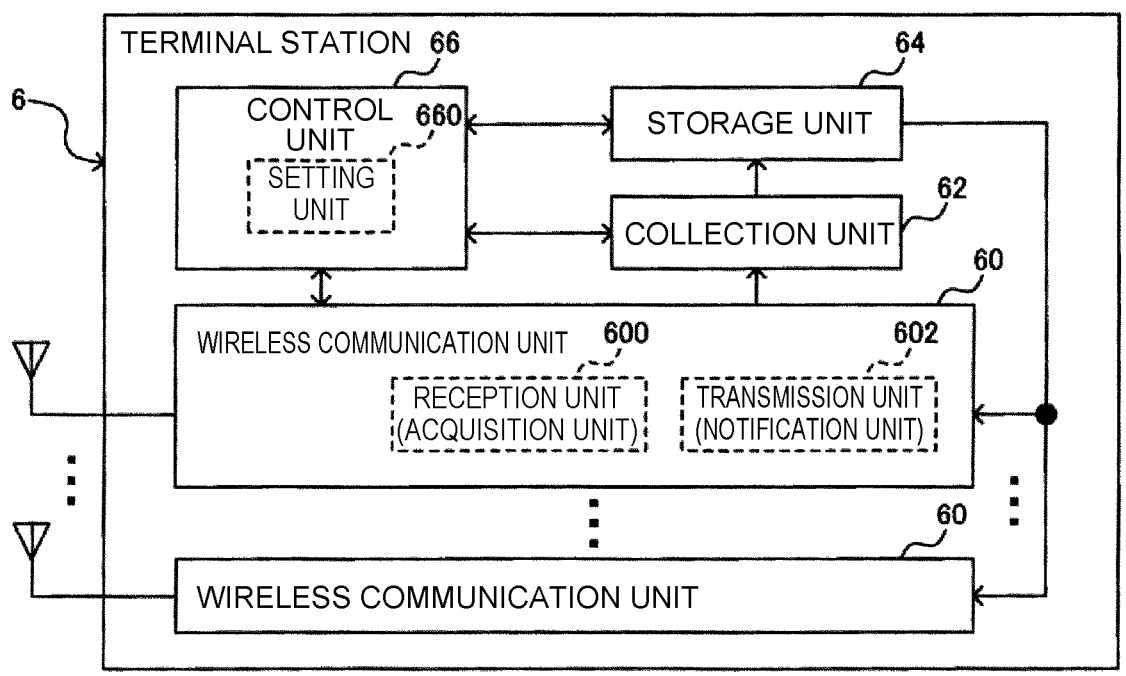
FIG. 2 is a functional block diagram illustrating an example of functions of a terminal station.

The terminal station 6 will be described first. FIG. 2 is a functional block diagram illustrating an example of functions of the terminal station 6. As illustrated in FIG. 2, the terminal station 6 includes, for example, a plurality of wireless communication units 60, a collection unit 62, a storage unit 64, and a control unit 66.

The wireless communication unit 60 includes a reception unit (acquisition unit) 600 and a transmission unit (notification unit) 602 and performs wireless communication with the base station 2 and other terminal stations 6.

The reception unit 600 acquires information by receiving signals transmitted by, for example, the base station 2 and other terminal stations 6 and outputs the information to the collection unit 62. The transmission unit 602 transmits (notifies) information, for example, stored in the storage unit 64 to the base station 2 and other terminal stations 6. Note that the wireless communication units 60 may use different frequency bands or may employ different communication schemes or may perform communication using the same communication scheme.

The collection unit 62 collects wireless environment information, or the like, indicating wireless environments around, for example, the base station 2 and other terminal stations 6 via the wireless communication unit 60 and outputs the wireless environment information, or the like, to the storage unit 64. The storage unit 64 stores the wireless environment information, or the like, collected by the collection unit 62.

The control unit 66 includes a setting unit 660 and controls respective units which constitute the terminal station 6. For example, the setting unit 660 performs setting for operation of the terminal station 6 based on information acquired by the wireless communication unit 60 from the base station 2.

Figure 3:
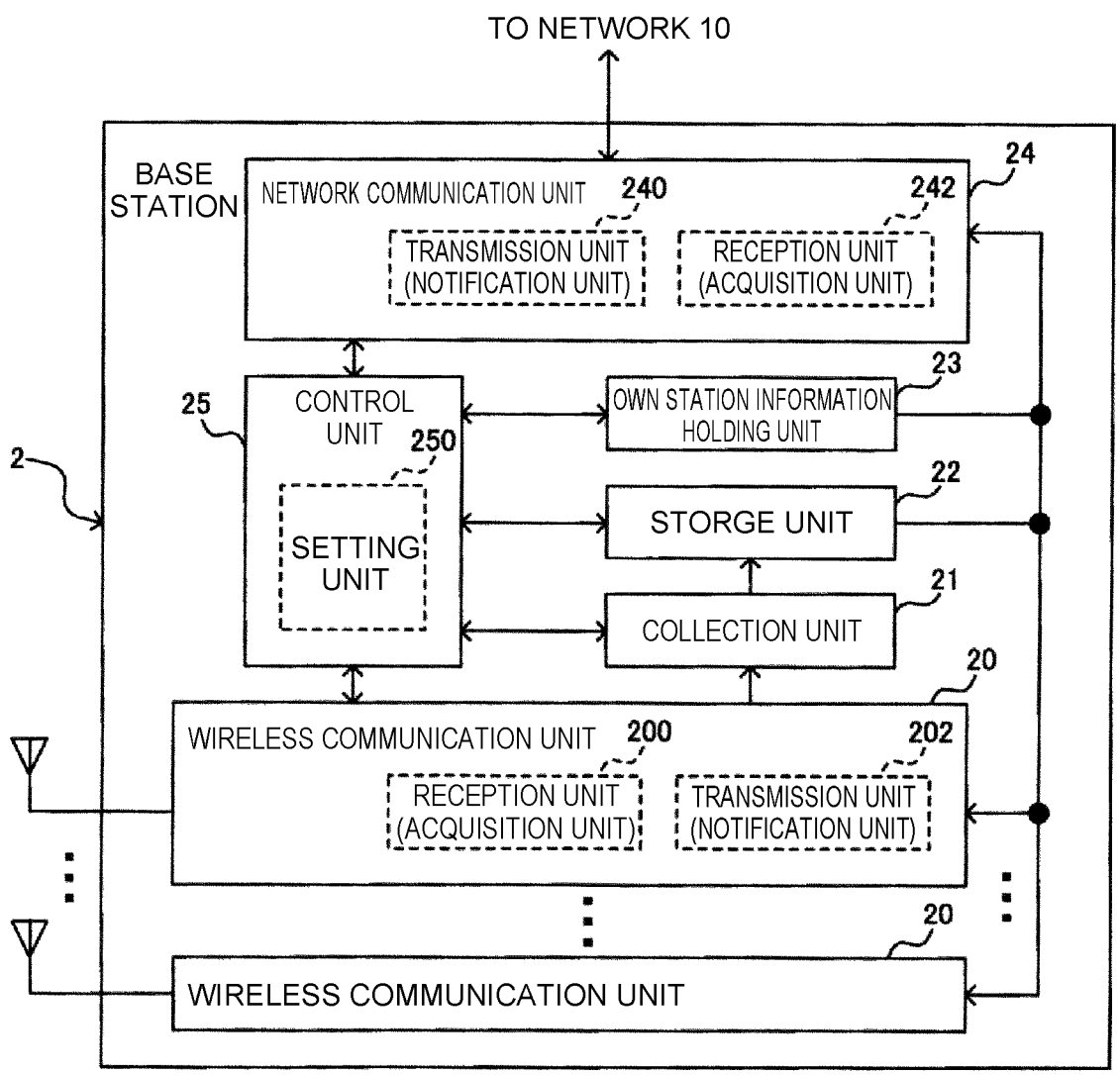
FIG. 3 is a functional block diagram illustrating an example of functions of a base station.

The base station 2 will be described next. FIG. 3 is a functional block diagram illustrating an example of functions of the base station 2. As illustrated in FIG. 3, the base station 2 includes, for example, a plurality of wireless communication units 20, a collection unit 21, a storage unit 22, an own station information holding unit 23, a network communication unit 24, and a control unit 25.

The wireless communication unit 20 includes a reception unit (acquisition unit) 200 and a transmission unit (notification unit) 202 and performs wireless communication with other base stations 2 and the terminal station 6.

The reception unit 200 acquires information by receiving signals transmitted by, for example, other base stations 2 and the terminal station 6 and outputs the information to the collection unit 21. The transmission unit 202 transmits (notifies) signals indicating, for example, information stored in the storage unit 64, own station information (which will be described later) held by the own station information holding unit 23, information acquired by the network communication unit 24 from the base station control device 4 via the intermediate processing device 8, or the like, to other base stations 2 and the terminal station 6. Note that the wireless communication units 20 may use different frequency bands or may employ different communication schemes or may perform communication using the same communication scheme.

The collection unit 21 collects wireless environment information, or the like, including a plurality of information items indicating, for example, wireless environments around other base stations 2 and the terminal station 6 from other base stations 2 and the terminal station 6 via the wireless communication units 20 and outputs the wireless environment information, or the like, to the storage unit 22. Note that the wireless environment information may include information regarding communication between the base station 2 and the terminal station 6 and information regarding an operation state of the base station 2. The storage unit 22 stores the wireless environment information, or the like, collected by the collection unit 21.

The own station information holding unit 23 holds information regarding the base station 2. For example, the own station information holding unit 23 holds own station information including specifications, functions, and the like, of the own station, such as a frequency band and a communication scheme to be used by the base station 2, the number of connectable terminal stations and the number of wireless communication units 20.

The network communication unit 24 includes a transmission unit (notification unit) 240 and a reception unit (acquisition unit) 242 and performs wired communication or wireless communication with the base station control device 4 via the network 10.

The transmission unit 240 transmits (notifies) signals indicating, for example, the information stored in the storage unit 22 and the own station information held by the own station information holding unit 23 to the base station control device 4. The reception unit 242 acquires information (individual second information such as a parameter which will be described later) by receiving signals transmitted by the base station control device 4 via the intermediate processing device 8. Further, the reception unit 242 outputs information which is received from the base station control device 4 and which should be transmitted to the terminal station 6, to the wireless communication unit 20.

The control unit 25, which includes a setting unit 250, controls respective units constituting the base station 2. For example, the setting unit 250 performs setting for operation of the base station 2 so that the base station 2 performs communication with the terminal station 6 based on second information which is acquired by the network communication unit 24 from the intermediate processing device 8 and which will be described later and information acquired by the wireless communication unit 20 from the terminal station 6.

For example, the setting unit 250 performs setting for operation of the base station 2 so as to correct, for example, radio wave interference relationship with other base stations based on individual second information (parameters) received by the reception unit 242. Further, the setting unit 250 may perform setting for operation of the terminal station 6.

Figure 4:
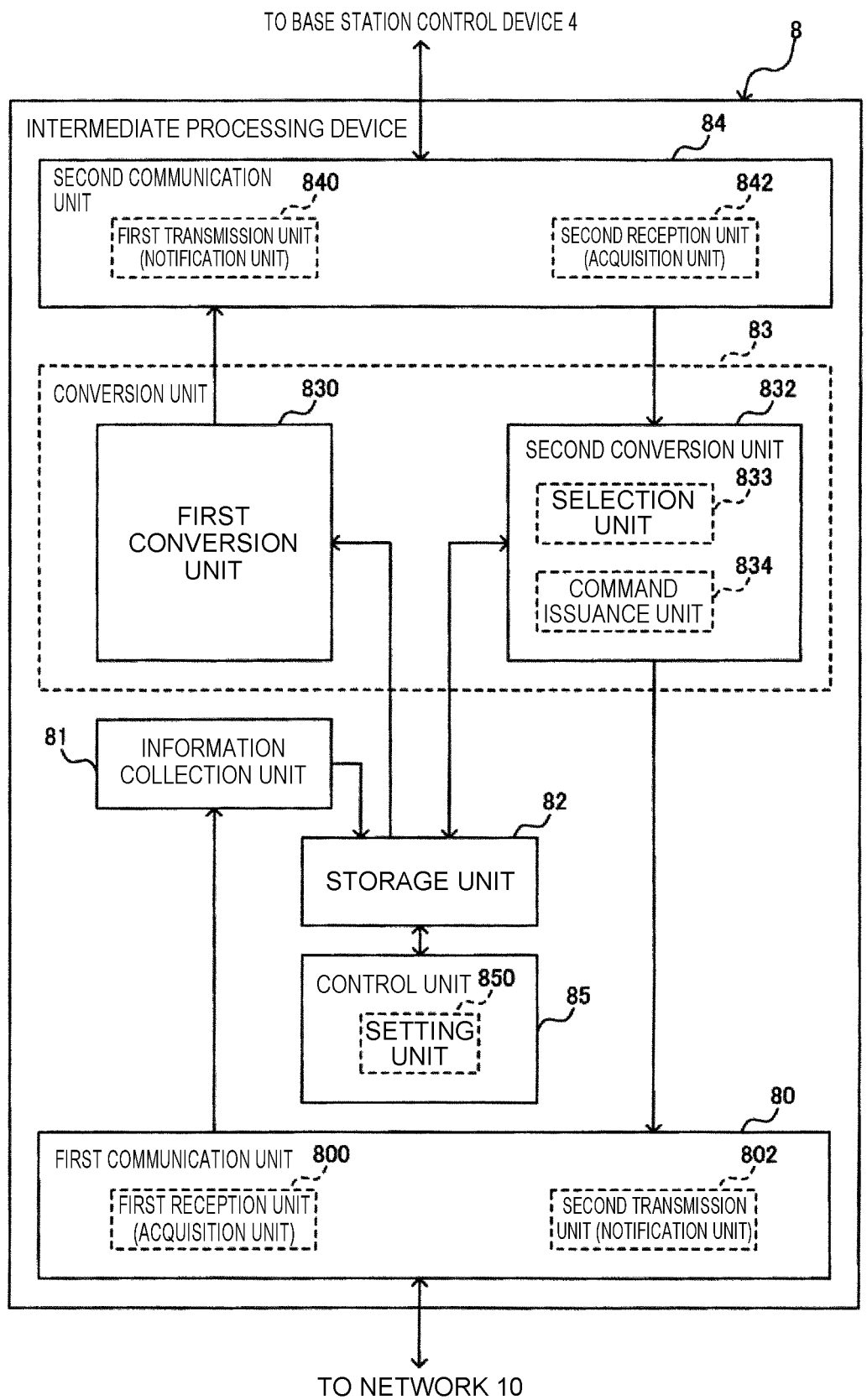
FIG. 4 is a functional block diagram illustrating an example of functions of an intermediate processing device according to one embodiment.

The intermediate processing device 8 will be described next. FIG. 4 is a functional block diagram illustrating an example of functions of the intermediate processing device 8 according to one embodiment. As illustrated in FIG. 4, the intermediate processing device 8 includes a first communication unit 80, an information collection unit 81, a storage unit 82, a conversion unit 83, a second communication unit 84 and a control unit 85 and performs processing between the base stations 2-1 to 2-*n* and the base station control device 4.

The first communication unit 80 includes a first reception unit (acquisition unit) 800 and a second transmission unit (notification unit) 802 and performs wired communication or wireless communication with each of the base stations 2-1 to 2-*n* via the network 10.

The first reception unit 800 acquires information by receiving signals transmitted by the base stations 2-1 to 2-*n* and outputs the information to the information collection unit 81. The second transmission unit 802 transmits information converted by a second conversion unit 832 to the base stations 2-1 to 2-n. For example, the second transmission unit 802 transmits individual second information which will be described later to each of the base stations 2.

The information collection unit 81 collects wireless environment information, or the like, received by the first reception unit 800 and outputs the wireless environment information, or the like, to the storage unit 82. The wireless environment information collected by the information collection unit 81, which includes information regarding the terminal station 6 connected to the base station 2, is information indicating wireless environments around the base station 2 and the terminal station 6.

The storage unit 82 stores the wireless environment information, or the like, collected by the information collection unit 81 and the second information, or the like, which will be described later. Further, the storage unit 82 temporarily stores first information so as to enable the base station control device 4 to calculate a parameter based on the first information, which will be described later. Still further, the storage unit 82 temporarily stores the second information so as to enable each of the base stations 2 to perform setting based on the second information.

The conversion unit 83 includes a first conversion unit 830 and a second conversion unit 832. The first conversion unit 830 converts the wireless environment information stored in the storage unit 82 into first information which is equally processable by the base station control device 4 without distinction for each of the base stations 2. For example, the first conversion unit 830 generates the first information not only by standardizing a format, or the like, of data based on the difference in functions of the respective base stations 2 by also by making standardization such that the difference in capabilities in terms of characteristics of the respective base stations 2 and types of control information are corrected and adjusted, and outputs the first information to the second communication unit 84.

The second conversion unit 832, which includes a selection unit 833 and a command issuance unit 834, converts information such as the parameter received by the second communication unit 84 from the base station control device 4 into individual second information in accordance with each of the base stations 2 and outputs the second information to the first communication unit 80 and the storage unit 82.

For example, the selection unit 833 selects the parameter received by the second communication unit 84 from the base station control device 4 in accordance with the functions and the capabilities in terms of characteristics of the respective base stations 2. The command issuance unit 834 issues a control command in accordance with the functions of the respective base stations 2. Then, the second conversion unit 832 generates individual second information for each of the base stations 2, including processing results of the selection unit 833 and the command issuance unit 834 and outputs the second information to the first communication unit 80 and the storage unit 82.

The second communication unit 84, which includes a first transmission unit (notification unit) 840 and a second reception unit (acquisition unit) 842, performs wired communication or wireless communication with the base station control device 4.

The first transmission unit 840 transmits the first information converted by the first conversion unit 830 to the base station control device 4. The second reception unit 842 receives the parameter, or the like, calculated by the base station control device 4 based on the first information.

The control unit 85, which includes a setting unit 850, controls respective units which constitute the intermediate processing device 8. The setting unit 850 may, for example, perform setting for each of the base stations 2 via the second conversion unit 832 and the first communication unit 80 based on the information acquired by the second communication unit 84 from the base station control device 4.

Figure 5:
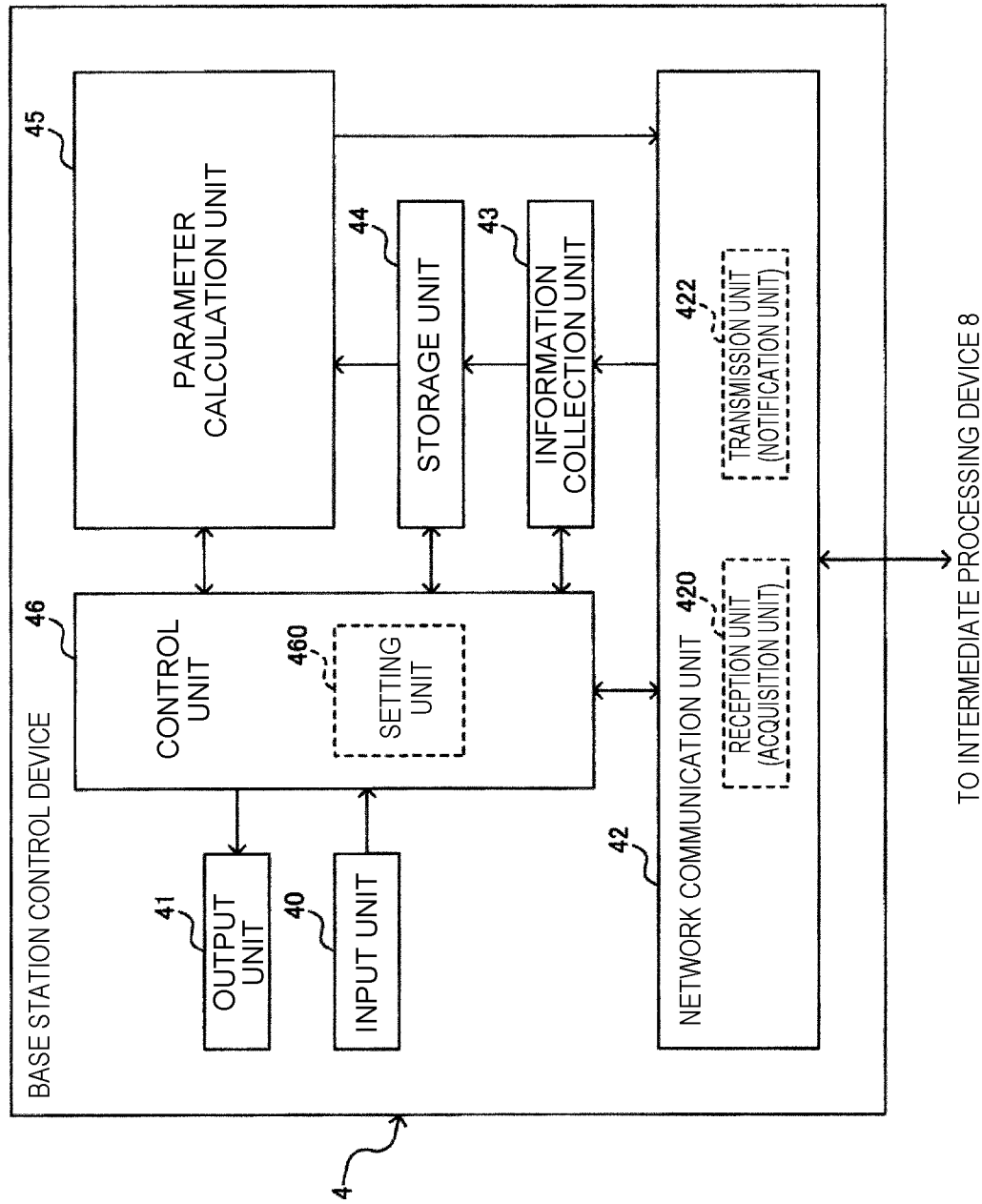
FIG. 5 is a functional block diagram illustrating an example of functions of a base station control device.

The base station control device 4 will be described next. FIG. 5 is a functional block diagram illustrating an example of functions of the base station control device 4. As illustrated in FIG. 5, the base station control device 4, which includes, for example, an input unit 40, an output unit 41, a network communication unit 42, an information collection unit 43, a storage unit 44, a parameter calculation unit 45 and a control unit 46, controls the base stations 2-1 to 2-n via the intermediate processing device 8.

The input unit 40 accepts input (such as instructions and settings) by a worker with respect to the base station control device 4. The output unit 41 outputs results, or the like, of processing by the base station control device 4 so as to show the results, or the like, to the worker.

The network communication unit 42, which includes a reception unit (acquisition unit) 420 and a transmission unit (notification unit) 422, performs wired communication or wireless communication with the base stations 2-1 to 2-n via the intermediate processing device 8 and the network 10.

The reception unit 420 receives information respectively transmitted by the base stations 2-1 to 2-n via the intermediate processing device 8 and outputs the received information to the information collection unit 43. For example, the reception unit 420 receives the first information transmitted by the intermediate processing device 8 and outputs the first information to the information collection unit 43. The transmission unit 422 transmits information, or the like, processed by the base station control device 4 to the base stations 2-1 to 2-n via the intermediate processing device 8. For example, the transmission unit 422 transmits the parameter calculated by the parameter calculation unit 45 to the base stations 2-1 to 2-n via the intermediate processing device 8.

The information collection unit 43 collects information (such as the first information) received by the reception unit 420 and outputs the information to the storage unit 44. For example, the information collection unit 43 collects the wireless environment information such as an operation log including a plurality of information items indicating wireless environments around each base station 2 and each terminal station 6 from each of the base stations 2-1 to 2-n via the intermediate processing device 8 and causes the collected results to be stored in the storage unit 44.

The information items to be included in the wireless environment information can include, for example, strength of an RSSI, traffic, the number of terminal stations 6 connected to the base station 2 (the number of connected terminals), channel utilization, a data rate, a channel transition log, or the like.

The parameter calculation unit 45 calculates a parameter for correcting radio wave interference relationship among the base stations based on the wireless environment information stored in the storage unit 44 and the priority set in advance for the base stations 2-1 to 2-n. For example, the parameter calculation unit 45 calculates a parameter so as to prioritize communication at a base station with higher priority over communication at a base station with lower priority.

Specifically, the parameter calculation unit 45 calculates a parameter for correcting radio wave interference relationship among the base stations by converting radio field strength of respective base stations with reference to a base station with the highest priority. For example, the parameter calculation unit 45 calculates a channel and a band width as part of the parameter so as to maximize an SINR in the corrected radio wave interference relationship or minimize an interference to noise power ratio (INR).

Further, the parameter calculation unit 45 may calculate a parameter for correcting radio wave interference relationship among the base stations by converting radio field strength of the respective base stations based on weights set in advance for the respective base stations which interfere with other base stations.

The control unit 46, which includes a setting unit 460, controls respective units which constitute the base station control device 4. Further, the control unit 46 causes results obtained by respective units which constitute the base station control device 4 processing information, to be stored in the storage unit 44.

The setting unit 460 performs setting for the respective units which constitute the base station control device 4. For example, the setting unit 460 performs setting for the information collection unit 43 and the parameter calculation unit 45 based on settings input by the worker via the input unit 40.

In other words, the intermediate processing device 8 converts the wireless environment information, or the like, respectively transmitted by the base stations 2 into the first information which is equally processable by the base station control device 4 and transmits the first information to the base station control device 4. Further, the intermediate processing device 8 converts information such as the parameter transmitted by the base station control device 4 into individual second information in accordance with each of the base stations 2 and transmits the individual second information to each of the base stations 2.

In this manner, in the wireless communication system 1, the intermediate processing device 8 converts information into the first information which is equally processable by the base station control device 4 and converts information into individual second information in accordance with each of the base stations 2, so that even if a plurality of base stations 2 have different capabilities in terms of characteristic or different functions, it is possible to enable collective control by the base station control device 4.

Part or all of respective functions of the base station 2, the base station control device 4 and the terminal station 6 may be implemented with hardware such as a programmable logic device (PLD) and a field programmable gate array (FPGA) or may be implemented as a program to be executed by a processor such as a CPU.

For example, the intermediate processing device 8 according to the present invention can be implemented using a computer and a program, and the program can be recorded in a storage medium or can be provided through a network.

Figure 6:
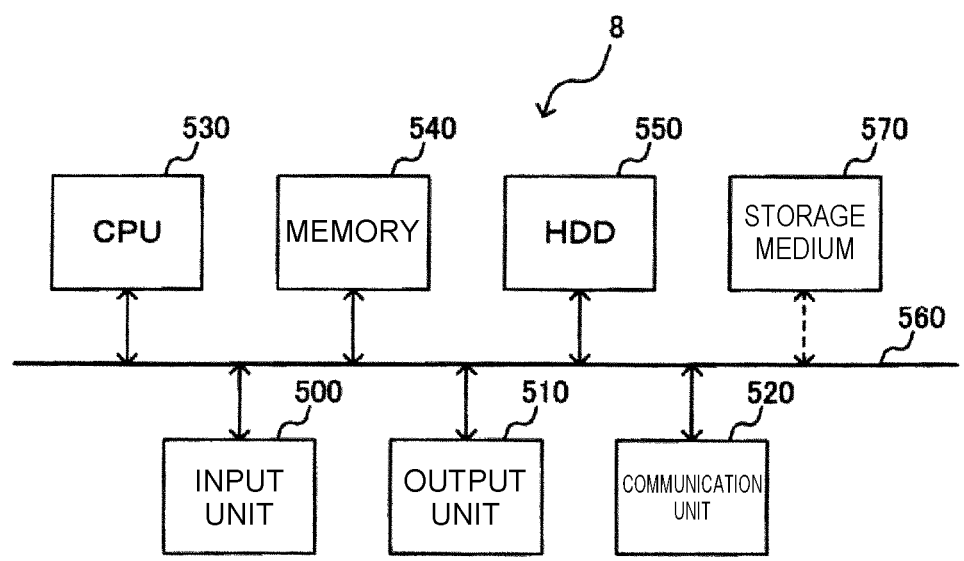
FIG. 6 illustrates a hardware configuration example of the intermediate processing device according to one embodiment.

FIG. 6 illustrates a hardware configuration example of the intermediate processing device 8 (the base station control device 4, the base station 2, the terminal station 6) according to one embodiment. As illustrated in FIG. 6, for example, the intermediate processing device 8, to which an input unit 500, an output unit 510, a communication unit 520, a CPU 530, a memory 540 and an HDD 550 are connected via a bus 560, has functions as a computer. Further, the intermediate processing device 8 can input/output data to/from a computer-readable storage medium 570.

The input unit 500 is, for example, a keyboard, a mouse, or the like. The output unit 510 is, for example, a display device such as a display. The communication unit 520, which is, for example, a wired or wireless network interface, can perform a plurality of wireless communications.

The CPU 530 controls respective units which constitute the intermediate processing device 8 and performs calculation, or the like, described above. The memory 540 and the HDD 550 constitute the storage unit 44 described above which stores data. Particularly, the memory 540 stores respective pieces of data to be used for calculation described above. The storage medium 570 can store a wireless communication program, or the like, for executing functions of the intermediate processing device 8. Note that architecture constituting the intermediate processing device 8 (the base station control device 4, the base station 2, the terminal station 6) is not limited to the example illustrated in FIG. 6.

In other words, it is assumed that the "computer" described here includes hardware such as an OS and peripheral equipment. Further, the "computer-readable storage medium" indicates a storage device such as a portable medium such as a flexible disk, a magnetooptical disk, a ROM and a CD-ROM.

Further, the "computer-readable storage medium" may include a medium which dynamically holds a program in a short period, such as a communication line in a case where a program is transmitted via a network such as the Internet or a communication line such as a telephone line, and a medium which holds a program in a certain period, such as a volatile memory inside a computer which becomes a server or a client in that case.

Figure 7:
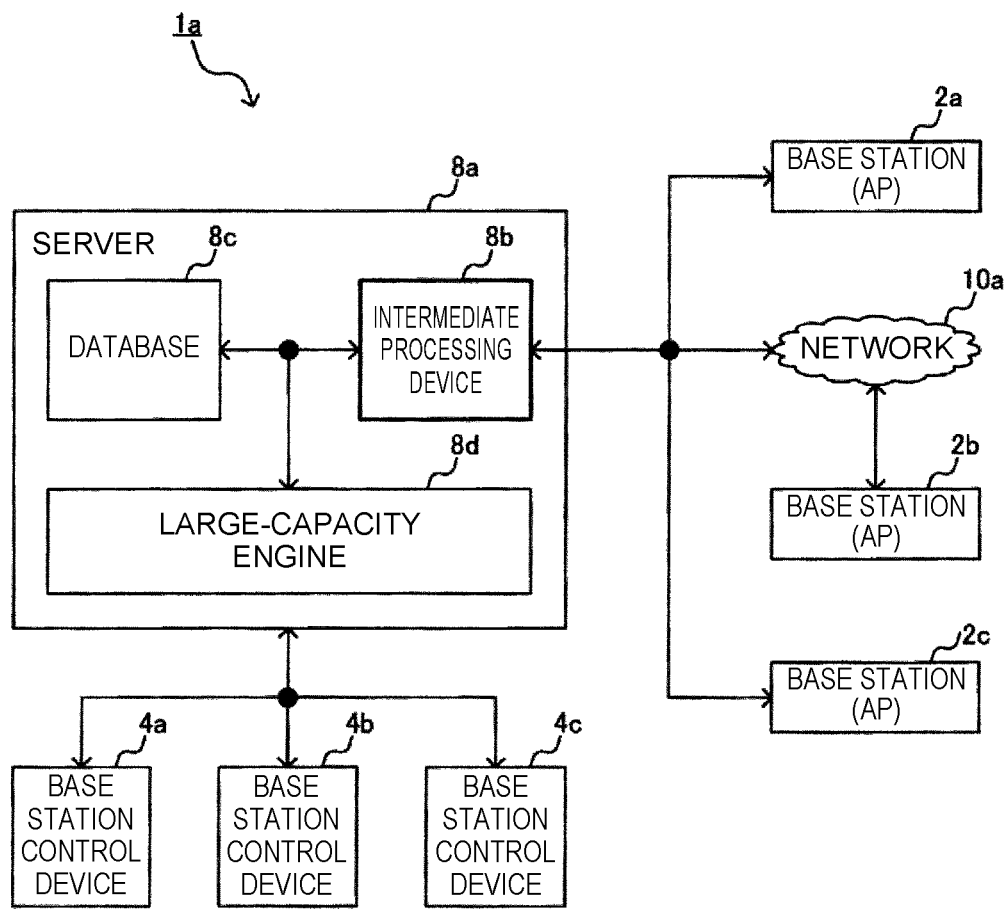
FIG. 7 illustrates a modified example of the wireless communication system according to one embodiment.

A modified example of the wireless communication system 1 will be described. FIG. 7 illustrates the modified example (wireless communication system 1a) of the wireless communication system 1. As illustrated in FIG. 7, the wireless communication system 1a includes base stations 2a to 2c, base station control devices 4a to 4c and a server 8a.

The base stations 2a to 2c have different functions, performance of interfaces, or the like, and the terminal stations 6 are connectable to the base stations 2a to 2c. For example, the base station 2a is connected to the server 8a via a predetermined application programming interface (API). The base station 2b is controlled using hypertext transfer protocol (HTTP)/hypertext transfer protocol secure (HTTPS) via the network 10a. The base station 2c includes a command line interface (CLI) which allows remote operation by a secure shell (SSH).

The server 8a includes an intermediate processing device 8b, a database 8c and a large-capacity engine 8d. The intermediate processing device 8b has functions similar to the functions of the intermediate processing device 8 described above. For example, the intermediate processing device 8b performs communication with the base stations 2a to 2c in accordance with individual interfaces of the respective base stations 2a to 2c. Further, the intermediate processing device 8b performs communication with the base station control devices 4a to 4c using HTTP/HTTPS.

The database 8c stores information regarding capabilities in terms of characteristics and functions of the base stations 2a to 2c and the base station control devices 4a to 4c and assists operation of the intermediate processing device 8b. The large-capacity engine 8d temporarily stores data and controls timings so that the base station control devices 4a to 4c can execute processing in parallel.

Each of the base station control devices 4a to 4c, for example, has functions similar to the functions of the base station control device 4 described above.

In other words, in the wireless communication system 1a, even if capabilities in terms of characteristics or functions of the respective base stations 2a to 2c are different, the server 8a performs conversion to absorb the differences of the respective base stations 2a to 2c so that the base station control devices 4a to 4c can collectively control the base stations.

While the embodiment of the present invention has been described above with reference to the drawings, the above-described embodiment is merely an example of the present invention, and it is obvious that the present invention is not limited to the above-described embodiment. Thus, components may be added, omitted, replaced, or changed within a range not deviating from the technical idea and the scope of the present invention.

REFERENCE SIGNS LIST 1, 1a Wireless communication system
2-1 to 2-n, 2a to 2c Base station
4, 4a to 4c Base station control device
6-1 to 6-m Terminal station
8, 8b Intermediate processing device
8a Server
8c Database
8d Large-capacity engine
10, 10a Network
20 Wireless communication unit
21 Collection unit
22 Storage unit
23 Own station information holding unit
24 Network communication unit
25 Control unit
40 Input unit
41 Output unit
42 Network communication unit
43 Information collection unit
44 Storage unit
45 Parameter calculation unit
46 Control unit
60 Wireless communication unit
62 Collection unit
64 Storage unit
66 Control unit
80 First communication unit
81 Information collection unit
82 Storage unit
83 Conversion unit
84 Second communication unit
85 Control unit
200, 242, 420, 600 Reception unit (acquisition unit)
202, 240, 422, 602 Transmission unit (notification unit)
250, 460, 660 Setting unit
500 Input unit
510 Output unit
520 Communication unit
530 CPU
540 Memory
550 HDD
560 Bus
570 Storage medium
800 First reception unit
802 Second transmission unit
830 First conversion unit
832 Second conversion unit
833 Selection unit
834 Command issuance unit
840 First transmission unit
842 Second reception unit

The invention claimed is:

1. A wireless communication system comprising:
a plurality of bases stations configured to electrically communicate with one or more terminal stations;
a base station control device configured to control one or more settings, functions or a combination thereof for the plurality of base stations;
an intermediate processing device configured to perform processing between the plurality of base stations and a base station control device which controls each of the base stations, wherein the plurality of base stations are configured to connect to one or more terminal stations, and wherein the intermediate processing device comprising:
an information collection unit configured to collect wireless environment information which includes information regarding the terminal stations connected to the base stations and which indicates wireless environments around the base stations and the terminal stations, from each of the base stations;
a first conversion unit configured to convert the wireless environment information collected by the information collection unit into first information which is equally processed by the base station control device without distinction for each of the base stations;
a transmission unit configured to transmit the first information to the base station control device;
a reception unit configured to receive a parameter calculated by the base station control device based on the first information; wherein the intermediate processing device further comprises: a storage unit configured to temporarily store the first information so as to enable the base station control device to calculate a parameter based on the first information and temporarily store the second information so as to enable each of the base stations to perform setting based on the second information; and
a second conversion unit configured to convert the parameter received by the reception unit into individual second information in accordance with each of the base stations,
and wherein each of the base stations comprising: a reception unit configured to receive the second information;
and a setting unit configured to perform setting so as to perform communication with each of the terminal stations based on the second information.

2. An intermediate processing device which performs processing between a plurality of base stations configured to electrically communicate to one or more terminal stations and a base station control device which controls each of the base stations, the intermediate processing device comprising:
a processor;
and a storage medium having computer program instructions stored thereon, when executed by the processor, perform to:
collect wireless environment information which includes information regarding the terminal stations connected to the base stations and which indicates wireless environments around the base stations and the terminal stations, from each of the base stations;

convert the wireless environment information into first information which is equally processed processable by the base station control device without distinction for each of the base stations;

transmit the first information to the base station control device;

receive a parameter calculated by the base station control device based on the first information;

a storage unit configured to temporarily store the first information so as to enable the base station control device to calculate a parameter based on the first information and temporarily store the second information so as to enable each of the base stations to perform setting based on the second information;

convert the parameter into individual second information in accordance with each of the base stations;

and transmit the individual second information to each of the base stations.

3. A communication control method for controlling a wireless communication system including a base station control device which controls each of a plurality of base stations in electrical communication to which terminal stations are connectable, the communication control method comprising:

an information collection step of collecting wireless environment information which includes information regarding the terminal stations connected to the base stations and which indicates wireless environments around the base stations and the terminal stations, from each of the base stations;

a first conversion step of converting the collected wireless environment information into first information which is equally processed by the base station control device without distinction for each of the base stations;

a first transmission step of transmitting the first information to the base station control device;

a reception step of receiving a parameter calculated by the base station control device based on the first information;

a first storage step of temporarily storing the first information so as to enable the base station control device to calculate a parameter based on the first information; and a second storage step of temporarily storing the second information so as to enable each of the base stations to perform setting based on the second information;

a second conversion step of converting the received parameter into individual second information in accordance with each of the base stations;

and a second transmission step of transmitting the individual second information to each of the base stations.

4. A non-transitory computer-readable medium having computer-executable instructions that, upon execution of the instructions by a processor of a computer, cause the computer to function as the wireless communication system according to claim 1.

5. The wireless communication system according to claim 1, wherein the wireless environment information includes at least one of information regarding communication between at least one of the plurality of base stations, information regarding an operation state of at least one of the plurality of base stations, or a combination there of.

6. The wireless communication system according to claim 1, wherein at least one base station of the plurality of base stations has one or more different capabilities in characteristics and one or more different functions than other base stations of the plurality of base stations.

7. The wireless communication system according to claim 6, wherein the one or more different capabilities in characteristics and the one or more different functions include a difference in sensitivity in received signal strength indicators (RSSIs) of the first base station and the second base station.

8. The wireless communication system according to claim 6, wherein the one or more different capabilities in characteristics and the one or more different functions include a difference between a number of antennas through which the one base station performs reception functions and a number of antennas through which the other base stations perform reception functions.

9. The wireless communication system according to claim 6, wherein the one or more different capabilities in characteristics and the one or more different functions include at least one of one or more different interfaces with one or more other devices, control commands or a combination thereof.

10. The wireless communication system according to claim 6, wherein the first conversion unit is configured to generate the first information by standardizing a format of data based on the difference in functions of each the first and the second base stations and types of control information corrected and adjusted; and outputs the first information to the transmission unit.

11. The wireless communication system according to claim 6, wherein the second conversion unit is configured to:

select the parameter received from the base station control device in accordance with functions and capabilities of a respective base station of the plurality of base stations and generates individual second information for each of the base station of the plurality of plurality of base stations; and output the second information.

12. The wireless communication system according to claim 11, wherein the individual second information for each of the plurality of base stations includes processing results of the second conversion unit.

13. The wireless communication system according to claim 1, wherein each base station of the plurality of base stations includes a priority preset, and the parameter is calculated to correct radio wave interference relationship among the plurality of base stations based on the wireless environment information and the priority.

14. The wireless communication system according to claim 1, wherein each base station of the plurality of base stations includes a priority setting and the parameter is calculated to prioritize communication at a base station with higher priority over communication at a base station with lower priority.

15. The wireless communication system according to claim 1, wherein each of the plurality of base station has a priority setting, and the parameter includes a parameter for correcting radio wave interference relationship among the plurality of base stations by converting radio field strength of respective base stations with reference to a base station with a higher priority.

16. The wireless communication system according to claim 1, wherein the parameter includes a channel setting and a bandwidth calculation calculated to provide at least one of maximize a signal to interference ratio (SINR) in a corrected radio wave interference relationship or minimize an interference to noise power ratio (INR).

17. The wireless communication system according to claim 1, wherein the base station control device includes a user interface configured to accept inputs by a worker, wherein the inputs include one or more settings, one or more instructions, or a combination thereof to operate the plurality of base stations.

* * * * *